United States Patent
Hirst et al.

(10) Patent No.: US 12,473,497 B2
(45) Date of Patent: Nov. 18, 2025

(54) PROCESSES AND SYSTEMS FOR REMOVING COKE PARTICLES FROM A PYROLYSIS EFFLUENT

(71) Applicant: EXXONMOBIL CHEMICAL PATENTS INC., Baytown, TX (US)

(72) Inventors: Thomas T. Hirst, Houston, TX (US); George Stephens, Huffman, TX (US); David Spicer, Houston, TX (US)

(73) Assignee: ExxonMobil Engineering and Technology Company, Spring, TX (US)

( * ) Notice: Subject to any disclaimer, the term of this patent is extended or adjusted under 35 U.S.C. 154(b) by 233 days.

(21) Appl. No.: 18/267,476

(22) PCT Filed: Dec. 30, 2021

(86) PCT No.: PCT/US2021/065604
§ 371 (c)(1),
(2) Date: Jun. 15, 2023

(87) PCT Pub. No.: WO2022/150218
PCT Pub. Date: Jul. 14, 2022

(65) Prior Publication Data
US 2024/0059980 A1    Feb. 22, 2024

Related U.S. Application Data

(60) Provisional application No. 63/135,259, filed on Jan. 8, 2021.

(30) Foreign Application Priority Data

Mar. 8, 2021 (EP) ..................... 21161155

(51) Int. Cl.
*C10G 9/16* (2006.01)
*B01D 45/06* (2006.01)

(52) U.S. Cl.
CPC ............... *C10G 9/16* (2013.01); *B01D 45/06* (2013.01); *C10G 2300/107* (2013.01); *C10G 2300/1074* (2013.01); *C10G 2300/1081* (2013.01)

(58) Field of Classification Search
CPC .......................... B01D 45/06; C10G 9/14–206
See application file for complete search history.

(56) References Cited

U.S. PATENT DOCUMENTS

| | | |
|---|---|---|
| 5,183,481 A | 2/1993 | Felder |
| 5,529,591 A | 6/1996 | Dewitz |
| 2011/0072772 A1 | 3/2011 | Ariessohn et al. |

FOREIGN PATENT DOCUMENTS

| | | |
|---|---|---|
| DE | 102014112724 | 3/2016 |
| FR | 3066406 | 11/2018 |

(Continued)

OTHER PUBLICATIONS

English machine translation of DE 10 2014 112724 (Year: 2016).*

*Primary Examiner* — Renee Robinson (57) ABSTRACT

Processes and systems for pyrolysing a hydrocarbon. In some examples, the process can include mixing a cooled hydrocarbon effluent and a cooled de-coking effluent to produce a combined effluent. The combined effluent can be introduced into an inlet conduit of a separator under conditions that provide >80 wt. % of the plurality of coke particles with a Stokes number of >10. From a first exit conduit of the separator >55 wt. % of the plurality of coke particles in the combined effluent can be removed, and from a second exit conduit of the separator a coke-lean hydrocarbon effluent that includes <45 wt. % of the plurality of coke particles in the combined effluent can be removed. The first exit conduit and the second exit conduit can be coupled to the inlet conduit.

25 Claims, 3 Drawing Sheets (56) References Cited

FOREIGN PATENT DOCUMENTS

| WO | 2005/052288 | 6/2005 | | |
|----|----|----|----|----|
| WO | WO-2019133215 A1 * | 7/2019 | ............ | B01J 19/002 |
| WO | 2020/191253 | 9/2020 | | |

* cited by examiner

PROCESSES AND SYSTEMS FOR REMOVING COKE PARTICLES FROM A PYROLYSIS EFFLUENT

CROSS-REFERENCE TO RELATED APPLICATIONS

This application is a US national phase application of PCT Application Serial No. PCT/US2021/065604 having a filing date of Dec. 30, 2021, which claims priority to and the benefit of U.S. Provisional Application No. 63/135,259 having a filing date of Jan. 8, 2021, and claims priority to EP 21161155.3 having a filing date of Mar. 8, 2021, the disclosures of all of which are incorporated herein by reference in their entireties.

FIELD

Embodiments disclosed herein generally relate to processes and systems for thermally cracking hydrocarbons to produce olefins, e.g., ethylene. More particularly, such embodiments relate to the removal of coke particles from a pyrolysis effluent.

BACKGROUND

Coke is a byproduct of hydrocarbon pyrolysis that forms on internal coil surfaces of the furnace, e.g., on inner surfaces of the radiant coils in a steam cracking furnace. The presence of coke reduces heat transfer to the hydrocarbon feedstock and steam mixture in the radiant coils, which reduces the amount of hydrocarbon that is cracked. The presence of coke can also lead to undesirable changes in radiant coil composition, e.g., as a result of carburization, leading to radiant coil deterioration. Accordingly, it is desirable to remove coke from one or more of the furnace coils during periodic "decoking" modes.

Within the industry the normal method for removing coke from the radiant coils is steam-air-decoking. The decoking can be carried out while the furnace is offline, i.e., no hydrocarbon feed is introduced into the radiant coils, steam and air are introduced to remove the coke producing a decoking effluent that includes spalled coke particle, which is directed away from the hydrocarbon product recovery system and into a decoking system. The decoking can also be carried out while the furnace is online, i.e., the hydrocarbon feed is removed from some of the radiant coils, but not all, and the decoking effluent that includes the steam and spalled coke particles is mixed with the steam cracker effluent that includes hydrocarbons and introduced into the hydrocarbon product recovery system. The particles of coke that enter the hydrocarbon recovery system can cause erosion within hydrocarbon separation equipment and the coke can accumulate within the hydrocarbon recovery system.

There is a need, therefore, for improved processes and systems for removing coke particles from a pyrolysis effluent, e.g., a steam cracker effluent during online decoking.

SUMMARY

Processes and systems for hydrocarbon pyrolysis are provided, including processes and systems for pyrolysis of hydrocarbons in the presence of an aqueous diluent such as those comprising steam. In some examples, the hydrocarbon pyrolysis process can include introducing a hydrocarbon feed into a pyrolysis furnace that can include a first radiant coil and a second radiant coil. At least a portion of the hydrocarbon feed can be pyrolysed in the first radiant coil to produce a first hydrocarbon effluent and to deposit coke on an inner surface of the first radiant coil. At least a portion of the hydrocarbon feed can be pyrolysed in the second radiant coil to produce a second hydrocarbon effluent and to deposit coke on an inner surface of the second radiant coil. A flow rate of the hydrocarbon feed into the first radiant coil can be decreased while maintaining a flow rate of the hydrocarbon feed into the second radiant coil. A decoking feed that can include steam or a mixture of steam and air can be introduced into the first radiant coil of the pyrolysis furnace to remove at least a portion of the coke deposited on the inner surface of the first radiant coil and to produce a de-coking effluent comprising steam and a plurality of coke particles. Heat can be indirectly exchanged from the second hydrocarbon effluent to water, steam, or a mixture thereof to produce a cooled second hydrocarbon effluent. Heat can be indirectly exchanged from the de-coking effluent to water, steam, or a mixture thereof to produce a cooled de-coking effluent. The cooled second hydrocarbon effluent and the cooled de-coking effluent can be mixed to produce a combined effluent. The combined effluent can be introduced into an inlet conduit of a separator under conditions that provide ≥80 wt. % of the plurality of coke particles with a Stokes number of ≥10. Greater than or equal to 55 wt. % of the plurality of coke particles in the combined effluent can be removed from a first exit conduit of the separator. A coke-lean hydrocarbon effluent that can include ≤45 wt. % of the plurality of coke particles in the combined effluent can be removed from a second exit conduit of the separator. The first exit conduit can be coupled to the inlet conduit and the second exit conduit can be coupled to the inlet conduit.

In some examples, a process for separating particles from a fluid can include introducing a mixture that can include a gaseous hydrocarbon and a plurality of particles into an inlet conduit under conditions that provide ≥80 wt. % of the plurality of particles with a Stokes number of ≥10. Greater than or equal to 55 wt. % of the plurality of particles in the mixture can be recovered from a first exit conduit coupled to the inlet conduit. A particle-lean gaseous hydrocarbon that can include ≤45 wt. % of the plurality of particles present in the mixture can be recovered from a second exit conduit coupled to the inlet conduit.

In some examples a separator for separating particles from a fluid can include an inlet conduit, a first exit conduit, a second exit conduit, and a particle receiving apparatus. The inlet conduit can be configured to receive an effluent that can include hydrocarbons, steam, and a plurality of coke particles. The inlet conduit can also be configured to provide ≥80 wt. % of the plurality of coke particles with a Stokes number of ≥10. The first exit conduit can be coupled to the inlet conduit. The second exit conduit can be coupled to the inlet conduit. The particle receiving apparatus can be in fluid communication with the first exit conduit and can be configured to receive coke particles. A longitudinal axis of the first exit conduit can be substantially aligned with a longitudinal axis of the inlet conduit. The second exit conduit can be angled with respect to the inlet conduit and the first exit conduit to provide an angle of about 20° to about 90° between a longitudinal axis of the second exit conduit and the longitudinal axis of the inlet conduit and an angle of about 90° to about 160° between the longitudinal axis of the second exit conduit and the longitudinal axis of the first exit conduit.

In some examples a hydrocarbon pyrolysis process can include introducing a hydrocarbon feed into a pyrolysis furnace that can include a first radiant coil and a second radiant coil. The hydrocarbon feed can include ethane, propane, naphtha, gas oil, vacuum gas oil, waxy residues, atmospheric residues, residue admixtures, crude oil, or a mixture thereof. At least a portion of the hydrocarbon feed can be pyrolysed in the first radiant coil to produce a first hydrocarbon effluent and to deposit coke on an inner surface of the first radiant coil. At least a portion of the hydrocarbon feed can be pyrolysed in the second radiant coil to produce a second hydrocarbon effluent and to deposit coke on an inner surface of the second radiant coil. A flow rate of the hydrocarbon feed into the first radiant coil can be decreased while maintaining a flow rate of the hydrocarbon feed into the second radiant coil. A decoking feed that can include steam or a mixture of steam and air can be introduced into the first radiant coil of the pyrolysis furnace to remove at least a portion of the coke deposited on the inner surface of the first radiant coil and to produce a de-coking effluent that can include steam and a plurality of coke particles. Heat can be indirectly exchanged from the second hydrocarbon effluent to water, steam, or a mixture thereof to produce a cooled second hydrocarbon effluent. Heat can be indirectly exchanged from the de-coking effluent to water, steam, or a mixture thereof to produce a cooled de-coking effluent. The cooled second hydrocarbon effluent and the cooled de-coking effluent can be mixed to produce a combined effluent. The combined effluent can be introduced into an inlet conduit of a separator under conditions that provide ≥80 wt. % of the plurality of coke particles with a Stokes number of ≥10 to about 20,000. Greater than or equal to 70 wt. % of the plurality of coke particles in the combined effluent can be removed from a first exit conduit of the separator. A coke-lean hydrocarbon effluent that can include ≤30 wt. % of the plurality of coke particles in the combined effluent can be removed from a second exit conduit of the separator. The first exit conduit can be coupled to the inlet conduit. The second exit conduit can be coupled to the inlet conduit. A longitudinal axis of the first exit conduit can be substantially aligned with a longitudinal axis of the inlet conduit. The second exit conduit can be angled with respect to the inlet conduit and the first exit conduit to provide an angle of about 45° to about 90° between a longitudinal axis of the second exit conduit and the longitudinal axis of the inlet conduit and an angle of about 90° to about 135° between the longitudinal axis of the second exit conduit and the longitudinal axis of the first exit conduit.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

It is to be understood that the following disclosure describes several exemplary embodiments for implementing different features, structures, and/or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the Figures. Moreover, the exemplary embodiments presented below can be combined in any combination of ways, i.e., any element from one exemplary embodiment can be used in any other exemplary embodiment, without departing from the scope of the disclosure.

Inertial separation can be used to separate coke particulates or coke particles from a pyrolysis effluent, e.g., a steam cracker effluent. The efficiency of such separation can be significantly increased by introducing an effluent that includes a mixture of a fluid, e.g., a gas, a liquid, or a mixture thereof, and a plurality of coke particles under conditions that provide ≥80 wt. % of the plurality of coke particles with a Stokes number of ≥10 when introduced into an inlet conduit of the separator. The separator can include an inlet conduit, a first or particle exit conduit coupled to the inlet conduit, and a second or particle-lean effluent exit conduit coupled to the inlet conduit. More particularly, it has been numerically quantified that by introducing the effluent into the inlet conduit of the separator under conditions that provide ≥80 wt. % of the plurality of coke particles with a Stokes number of ≥10, from the first exit conduit ≥55 wt. % of the plurality of coke particles can be recovered from the separator and from the second exit conduit a particle-lean effluent containing ≤45 wt. % of the plurality of coke particles can be recovered from the separator.

In some examples, a longitudinal axis of the first exit conduit can be substantially aligned with a longitudinal axis of the inlet conduit and a longitudinal axis of the second exit conduit can be angled with respect to the longitudinal axis of the inlet conduit and the longitudinal axis of the first exit conduit. In some examples, the longitudinal axis of the second exit conduit can be at an angle (α) of about 20° to about 90° relative to the longitudinal axis of the inlet conduit and the longitudinal axis of the second exit conduit can be at an angle (β) of about 90° to about 160° relative to the longitudinal axis of the first exit conduit. In other examples, the longitudinal axis of the second exit conduit can be at an angle (α) of about 45° to about 90° relative to the longitudinal axis of the inlet conduit and the longitudinal axis of the second exit conduit can be at an angle (β) of about 90° to about 135° relative to the longitudinal axis of the first exit conduit.

The inner diameter of the inlet conduit, the first exit conduit, and the second exit conduit can be the same or different with respect to one another. In some examples, the inner diameter of the first exit conduit can be greater than the inner diameter of the inlet conduit and the second exit conduit. In other examples, the inner diameter of the inlet conduit can be greater than the inner diameter of the first exit conduit and the second exit conduit. The inner diameter of the inlet conduit, the first exit conduit, and the second exit conduit can be sized according to the particular process the separator is to be used in and can widely vary depending on the particular process.

In some examples, the separator can be an "off the shelf" pipe joint such as a 90° pipe tee fitting or a 45° lateral tee pipe fitting. In other examples, the separator can be custom manufactured to have any desired arrangement of the inlet conduit, the first exit conduit, and the second exit conduit.

In some examples, the separator having the inlet conduit and the first and second exit conduits coupled thereto can be configured to introduce an effluent that includes the plurality of particles into the inlet conduit of the separator such that ≥70 wt. %, ≥75, ≥80 wt. %, ≥83 wt. %, ≥85 wt. %, ≥87 wt. %, or ≥90 wt. % of the plurality of coke particles has a Stokes number of ≥10, ≥20, ≥30, ≥50, ≥100, ≥500, ≥1,000, ≥, 2,000, ≥3,000, ≥3,500, or ≥4,000, and from the first exit conduit ≥55 wt. %, ≥60 wt. %, ≥65 wt. %, ≥70 wt. %, ≥75 wt. %, ≥80 wt. %, ≥85 wt. %, ≥90 wt. %, or ≥95 wt. % of the plurality of particles can be recovered therefrom. In some examples, ≥80 wt. % such as about 85 wt. % to about 99 wt. % of the plurality of particles can have a Stokes number of ≥10, e.g., about 100, about 500, about 1,000, or about 2,000 to about 5,000, about 10,000, about 15,000, about 20,000 or greater, when introduced into the inlet conduit of the separator and ≥55 wt. %, e.g., about 60 wt. % to about 97 wt. % of the plurality of particles can be recovered from the first exit conduit.

Volumetric and mass flow rate of decoking effluent and feed effluent through radiant coils, and therefore the volumetric and mass flow rate of the furnace effluent through the separator can be controlled during the decoking phase to achieve the required separation efficiency alongside other decoking parameters. Mass flow rate of the decoking effluent can be adjusted such that the stokes number of the particles is sufficient for separation. Or in some cases the design of the separator such as the diameter of the inlet conduit, the diameter of the first exit conduit, the diameter of the second exit conduit, angles α and β in FIG. 1, and/or the use of flow direction adjacent to the separator can be manipulated for a given volumetric or mass flow rate of furnace effluent. In some examples, the combined effluent can be introduced into the inlet conduit of the separator at a velocity of about 45 m/s, about 15 m/s, or about 25 m/s to about 35 m/s, about 50 m/s, about 65 m/s, about 85 m/s, or about 95 m/s.

It should be understood that the separators disclosed herein can be used to separate particles from a wide range of mixtures that include one or more fluids and a plurality of particles. Illustrative mixtures can include, but are not limited to, a steam cracker effluent that includes a plurality of coke particles, a fluidized catalytic cracker effluent that includes a plurality of catalyst particles, a gasifier effluent that includes a plurality of coke particles, and the like. For simplicity and ease of description, the process will be further described in the context of separating a plurality of coke particles from a steam cracker effluent that includes a plurality of coke particles.

Figure 1:
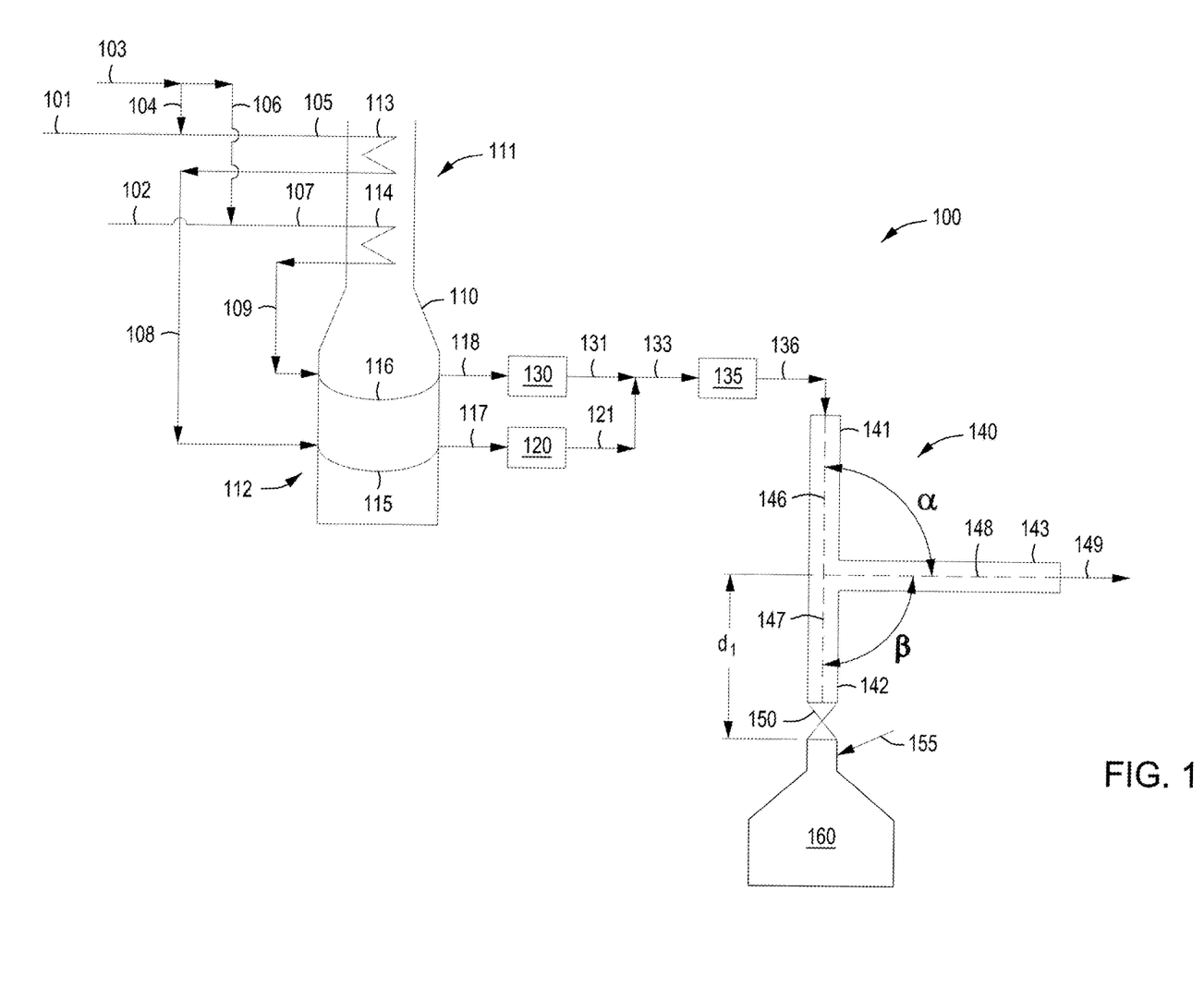
FIG. 1 depicts a schematic of an illustrative system for steam cracking a hydrocarbon and recovering spalled coke therefrom during online decoking, according to one or more embodiments described.

FIG. 1 depicts a schematic of an illustrative system 100 for steam cracking a hydrocarbon feed in lines 101 and 102 and recovering spalled coke via a first exit conduit 142 of a separator 140 during online decoking, according to one or more embodiments. The system 100 can include one or more steam crackers 110, one or more primary heat exchange stages (two are shown) 120 and 130, one or more secondary heat exchange stages 135, and one or more separators 140. The system 100 can also include one or more particle receiving or coke catch apparatus 160. In some examples one, one or more flow control devices 150, e.g., a valve, can fluidly connect or couple an end of the first exit conduit to the coke receiving apparatus 160.

In some examples, the hydrocarbon feeds in lines 101 and 102 can be mixed, blended, combined, or otherwise contacted with steam in line 103 to produce a hydrocarbon and steam mixture. For example, the steam in line 103 via lines 104 and 106 can be mixed with the hydrocarbon feed in lines 101 and 102 to produce the mixtures in lines 105 and 107, respectively. The mixtures in lines 105 and 107 can be heated within convection coils 113, 114 disposed within a convection section 111 of the steam cracker 110 to produce heated mixtures via lines 108 and 109, respectively. The heated mixtures in lines 108 and 109 can be heated and subjected to steam cracking conditions within radiant coils 115, 116 in a radiant section 112 of the steam cracker 110 to produce steam cracker effluents via line 117 and 118, respectively. It should be understood that the radiant coils 115, 116 can be oriented within the radiant section 112 in any desired direction, e.g., generally horizontal, generally vertical, or any angle therebetween.

It should be understood that while only two hydrocarbon feeds via lines 101 and 102 are shown, the process is not limited to any particular number of hydrocarbon feeds. For example, the process can be compatible with a convection section 111 and a radiant section 112 that include 3, 4, 6, 8, 10, 12, 16, or 18 or more sets of corresponding convection coils and radiant coils for conveying in equal or unequal portions of a total hydrocarbon feed. It should also be understood that the hydrocarbon feeds in lines 101 and 102 and any additional hydrocarbon feed lines can be the same or different with respect to one another. It should also be understood that the effluents from two or more pyrolysis furnaces, e.g., steam crackers, can be mixed, blended, or otherwise combined and introduced into the one or more separators 140. For example, the effluents from 2, 3, 4, 5, 6, 7, 8, or more pyrolysis furnaces can be combined and introduced into the one or more separators.

Illustrative steam cracking conditions can include, but are not limited to, one or more of: exposing the heated mixture of the hydrocarbon feed and steam in line 108 or a vapor phase product separated therefrom to a temperature (as measured at a radiant outlet of a steam cracking apparatus) of ≥400° C., e.g., a temperature of about 700° C., about 800° C. or about 900° C. to about 950° C., a pressure of about 0.1 bar to about 5 bars (absolute) or more, and/or a steam cracking residence time of about 0.01 seconds to about 5 seconds. In some examples, the hydrocarbon and steam mixture in lines 105 and 107 can include steam in an amount in of about 10 wt. % to about 90 wt. %, based on the weight of the hydrocarbon and steam mixture. In some examples, the heated mixtures in lines 108 and 109 or a vapor phase product separated therefrom can be steam cracked according to the processes disclosed in U.S. Pat. Nos. 6,419,885; 7,993,435; 9,637,694; and 9, 777,227; and International Patent Application Publication No. WO 2018/111574.

In some examples, the steam cracker effluents in line 117 and 118 can be at a temperature of ≥300° C., ≥400° C., ≥500° C., ≥600° C., or ≥700° C., or ≥800° C., or more. In certain aspects, the temperature of the steam cracker effluents in line 117 and 118 can be at a temperature of about 425° C. to 850° C., e.g., about 450° C. to about 800° C. In some examples, the mixture in line 103 can be steam cracked according to the processes and systems disclosed in U.S. Pat. Nos. 6,419,885; 7,993,435; 9,637,694; and 9,777,227; and International Patent Application Publication No. WO 2018/111574.

The steam cracker effluents in lines 117 and 118 can be cooled by indirect heat exchange in a first heat exchange stage 120, 130, respectively, e.g., via one or more transfer line exchangers, with steam to produce steam, e.g., medium pressure steam or superheated steam, and pre-cooled steam cracker effluents via lines 121 and 131. In other examples, the steam cracker effluents in lines 117 and 118 can be cooed by direct contact with a quench medium to produce precooled steam cracker effluents via lines 121 and 131. In still other examples, the stem cracker effluents in lines 117 and 118 can be cooled by indirect heat exchange and by direct contact with a quench medium to produce the pre-cooled steam cracker effluents via lines 121 and 131. The precooled steam cracker effluents in lines 121 and 131 can be mixed, blended, combined, or otherwise contacted with one another to produce a combined effluent mixture in line 133. The combined effluent mixture in line 133 can be cooled by indirect heat and/or by direct contact with a quench medium exchange in the secondary heat exchange stage 135. In some examples, the combined effluent mixture in line 133 can produce a preheated boiler feed water, heat the hydrocarbon feeds in lines 101 and/or 103, and/or be cooled by direct contact with a quench medium. In some examples the steam cracker effluents in lines 117 and 118 can be mixed, blended, combined, or otherwise contacted with a quench fluid to produce cooled or first cooled steam cracker effluents, either before or after the cooling in the first heat exchange stage 120, 130 and/or the second heat exchange stage 135. When the heated hydrocarbon feed and steam mixtures in lines 108 and 109 flow into the radiant section 112 of the steam cracker 110, the flow control device 150 can be in a closed position. As such, the cooled steam cracker effluent introduced into the separator 140 can flow into the inlet conduit 141 and out via the second exit conduit 143.

During steam cracking of the hydrocarbon feeds in lines 101 and 102, carbonaceous deposits ("coke") can accumulate in one or more regions of the steam cracking furnace 110, e.g., in the convection coils 113, 114, in the radiant coils 115, 116, transfer lines 108, 109, etc. When coke accumulates on the internal surfaces of the radiant coils 115, 116, the accumulated coke can decrease the effective cross-sectional area of the tube, thereby necessitating higher pressures to maintain a constant throughput. Since coke is an effective insulator, the deposition of coke on the inner surfaces of the radiant coils 115, 116 can be accompanied by an increase in furnace tube temperature to maintain cracking efficiency. High operating temperatures, however, can result in a decrease in radiant coil lifetime, a decrease in yield of desired products (primarily as a result of less selective cracking which occurs at higher pressures), and an increase in coke accumulation rate. These effects lead to practical limits on the temperature to which a radiant coil can be exposed and consequently reduce the flexibility to overcome the undesirable effects of coke accumulation by increasing radiant coil temperature. In practice, at the start of pyrolysis mode, when radiant coil internal surface has little or no accumulated coke, the radiant coil can exhibit a start-of-run temperature. As coke accumulates, the radiant coil temperature can be increased (in response to increased firebox burners' caloric output) to a pre-determined end-of-run temperature. Coke accumulation can be observed directly or indirectly, e.g., as indicated by a greater pressure drop across the radiant coil and/or a lower temperature of the radiant coil effluent (at a substantially constant caloric output of the firebox burners). Radiant coil temperature can be increased (e.g., by increasing firebox burner caloric output) until the radiant coil temperature is at or near the pre-determined end of run temperature, at which point the radiant coil can be designated for decoking. The designated coils (and conduits/vessels) can be switched from pyrolysis mode to decoking mode.

For example, the radiant coil 115 can accumulate sufficient coke that requires the radiant coil 115 to be decoked while radiant coil 116 remains in steam cracking mode. The process for decoking can include the steps of supplying a decoking feed into line 105 and reducing or terminating the flow of hydrocarbon feed via line 101 to effect removal of coke accumulated on the inner surface of the radiant coil 115, and returning the radiant coil 115 to steam cracking conditions by returning the flow of hydrocarbon feed into line 101.

In some examples, the decoking feed can be or include steam, air, or a mixture of steam and air. The steam can be low pressure steam, medium pressure steam, or high pressure steam. In some examples, the decoking feed can have a pressure of ≥690 kPag, ≥930 kPag, ≥1,200 kPag, ≥1,380 kPag, ≥1,725 kPag, ≥ or 1,930 kPag. In some examples, the decoking feed can have a pressure of 690 kPag to 4,140 kPag, 690 kPag to 1,930 kPag, 690 kPag to 1,725 kPag, 930 kPag to 4,140 kPag, 930 kPag to 1,930 kPag, 930 kPag to 1,725 kPag, 1,725 kPag to 4,140 kPag, 930 kPag to 1,380 kPag, or 1,380 kPag to 1,725 kPag. In some examples, the decoking feed can be supplied from letdown high pressure steam (about 1,725 kPag to about 4,140 kPag), medium pressure steam (about 930 kPag to about 1,380 kPag), medium-high pressure steam (about 1,380 kPag to about 1,725 kPag), low pressure steam (<930 kPag), or dilution steam recycled from the condensed water component of furnace effluent (effectively recycled steam) often called dilution steam. In some examples, the decoking feed can be essentially free of added water. In some examples, the decoking feed can comprise ≤1 wt. %, ≤0.1 wt. %, or ≤0.01 wt. % of water when introduced into the first radiant coil.

The decoking process can include reducing the flow of hydrocarbon feed in line 101, e.g., by closing a flow control device such as a valve. In some examples, the overall or total flow of the hydrocarbon feed into the steam cracker 110 can be decreased by about 10 vol. % to about 90 vol. %, about 10 vol. % to about 40 vol. %, or about 10 vol. % to about 20 vol. %. Since the hydrocarbon feed can continue to be introduced into one or more convection coils, e.g., via line 102, on-stream decoking can occur when some of the hydrocarbon feeds continue to be introduced into the steam cracker 110. In other examples, the overall or total flow of the hydrocarbon feed into the steam cracker 110 may remain constant. While on-stream decoking can occur to one or more of the convection coils 113 and 114, the flow of hydrocarbon feed to the other convection coils may be sufficiently increased to keep total unit production constant through the decoking mode.

The decoking feed, e.g., steam, air, or a mixture of steam and air, via line 104 can continue to be introduced via line 105 into the convection section 111 causing on-stream decoking when the hydrocarbon feed is still being introduced via line 107 into the convection section 111. In some examples, the decoking feed via line 105 is provided from letdown steam or dilution steam recycled from the condensed water component of furnace effluent. In some examples, the decoking feed, e.g., steam, via line 104 can be from the same source as the steam utilized during steam cracking. In some examples, the flow rate of the decoking feed in line 104 can be increased or decreased relative to the flow rate used during steam cracking. In some examples, where the flow rate of the decoking feed has increased relative to the flow rate of the steam utilized during steam cracking, the pressure can be increased to maintain the pressure within the desired range. Therefore the flow of the decoking feed via line 108 into the radiant coil 115 can have a reduced amount of hydrocarbon feed, e.g., no hydrocarbon feed, such that decoking can occur in the radiant coil 115 while steam cracking is still occurring in radiant coil 116 that does not have a reduced amount of hydrocarbon feed. After the decoking step is completed, the hydrocarbon feed via line 101 can be reintroduced, air (if used) can be stopped, and if needed the steam flow rate and/or pressure in line 104 can be adjusted.

When the radiant coil 115 undergoes decoking, the decoking effluent can be conducted away via line 117 from the steam cracker 110 and be mixed with the steam cracker effluent in line 131 to form a steam cracker effluent and decoking effluent mixture or combined effluent via line 133. As such, during decoking of one or more radiant coils, the flow control device 150, e.g., valve, can be opened to allow at least a portion, e.g., ≥55 wt. %, the plurality of coke particles in the combined effluent to flow through the first exit conduit 142, through the flow control device 150, and into the coke receiving apparatus 160. The coke receiving apparatus 160 can include a number of different containment devices, e.g., collection vessels, collection drums, tanks, and/or rail cars.

In some examples, the combined effluent via line 136 can be introduced into the inlet conduit 141 of the separator 140 at a velocity of about 15 m/s, about 20 m/s, about 25 m/s, about 30 m/s, about 35 m/s, about 40 m/s, or about 45 m/s to about 50 m/s, about 60 m/s, about 70 m/s, about 80 m/s, or about 95 m/s.

During decoking the flow of the combined effluent in line 136 can be under conditions that provide ≥80 wt. % of the plurality of coke particles with a Stokes number of ≥10. By introducing the combined effluent in line 136 into the first inlet 141 under conditions that provide ≥80 wt. % of the plurality of coke particles with a Stokes number of ≥10 a majority, e.g., >50 wt. % such as ≥55 wt. % of the plurality of coke particles in the combined effluent can flow into the first exit conduit 142, through the opened flow control device 150, and into the coke receiving apparatus 160.

In some examples, the Stokes number of the plurality of coke particles in the combined effluent can be affected by providing the transfer conduit 136 with an appropriate inner diameter for a given system 100. For example, the Stokes number for the plurality of coke particles in the combined effluent flowing through line 136 can be increased by reducing a diameter of the transfer conduit 136 and decreased by increasing the diameter of the transfer conduit 136. As such, depending on the particular system and process the transfer line 136 can be correctly sized to provide the plurality of particles with a Stokes number of ≥10.

In some examples, the Stokes number for the plurality of coke particles in the combined effluent can be affected by the velocity of the combined effluent flowing through the transfer conduit 136. For example, the Stokes number for the plurality of coke particles in the combined effluent flowing through line 136 can be increased by increasing the velocity of the combined effluent within the transfer conduit 136 and decreased by decreasing the velocity of the combined effluent within the transfer conduit 136. In another example, the Stokes number for the plurality of coke articles in the combined effluent flowing through line 136 can be increased by increasing a rate of steam introduced via lines 104 and/or 106 and decreased by decreasing the rate of steam introduced via lines 104 and/or 106. As such, depending on the particular system and process the velocity of the combined effluent within transfer line 136 can be adjusted or controlled to provide the plurality of particles with a Stokes number of ≥10.

In some examples, the Stokes number for the plurality of coke particles in the combined effluent can be affected by the density of the combined effluent flowing through the transfer conduit 136. As such, depending on the particular system and process the density of the combined effluent within transfer line 136 can be adjusted or controlled to provide the plurality of particles with a Stokes number of ≥10. In some examples, the density of the combined effluent in line 136 can be adjusted by adding a denser fluid thereto, adding a less dense fluid thereto, or a combination thereof.

In some examples, the Stokes number for the plurality of coke particles in the combined effluent can be controlled, adjusted, or otherwise modified in-situ by controlling, adjusting, or otherwise modifying the velocity and/or the density of the combined effluent for a given system and coke particle distribution.

In some examples, a longitudinal axis 147 of the first exit conduit 142 can be substantially aligned with a longitudinal axis 146 of the inlet conduit 141 and a longitudinal axis 148 of the second exit conduit 143 can be angled with respect to the longitudinal axis 146 of the inlet conduit 141 and the longitudinal axis 147 of the first exit conduit 142. In some examples, the longitudinal axis 148 of the second exit conduit 143 can be at an angle ($\alpha$) of about 20° to about 90° relative to the longitudinal axis 146 of the inlet conduit 141 and the longitudinal axis 148 of the second exit conduit 143 can be at an angle ($\beta$) of about 90° to about 160° relative to the longitudinal axis 147 of the first exit conduit 142. In other examples, the longitudinal axis 148 of the second exit conduit 143 can be at an angle of about 45° to about 90° relative to the longitudinal axis 146 of the inlet conduit 141 and the longitudinal axis 148 of the second exit conduit 143 can be at an angle ($\beta$) of about 90° to about 135° relative to the longitudinal axis 147 of the first exit conduit 142. In some examples, the separator 140 can be an "off the shelf" pipe joint such as a 90° pipe tee fitting or a 45° lateral tee pipe fitting. In other examples, the separator 140 can be custom manufactured to have any desired arrangement of the inlet conduit 141, the first exit conduit 142, and the second exit conduit 143.

As shown in FIG. 1, the separator 140 can be oriented such that the longitudinal axis 146 of the inlet conduit 141 and the longitudinal axis 147 of the first outlet conduit 142 can be substantially vertical, i.e., with respect to a surface of the earth. In some examples, however, the separator 140 can be oriented such that the longitudinal axis 146 of the inlet conduit 141 and the longitudinal axis 147 of the first outlet conduit 142 can be substantially horizontal, i.e., with respect to a surface of the earth. In other examples, the separator 140 can be oriented such that the longitudinal axis 146 of the inlet conduit 141 and the longitudinal axis 147 of the first outlet conduit 142 can be at any angle between vertical and horizontal, i.e., with respect to a surface of the earth.

In some examples, a flow path from the inlet conduit 141 into the first exit conduit 142 can be free of any obstruction. In some examples a flow path from the inlet conduit 141 into the second exit conduit 143 can be free of any obstruction. In some examples, a flow path through transfer line 136 can be free of any obstructions. In some examples, the flow path through the transfer line 136 can include one or more obstructions, the obstruction(s) configured to bias a flow of the decoking effluent therein away from the inlet conduit 141 of the separator. In some examples, obstructions such as pipe elbows, pipe fittings, etc., upstream of the separator 140 can be evaluated to provide the particles the required flow path and Stokes number to enter the inlet conduit 141. This can be evaluated by mathematical models, regression of previous computational fluid dynamics models, and/or with computational fluid dynamics software modeling each particular system. In some examples, no obstructions are introduced for many diameters upstream of the separator 140 such that the particles are more likely to separate from the flow path of the gaseous components that flow into the second exit conduit 143. Without detailed analysis of the particle flow path, obstructions can be minimized to ensure particle separation. In other examples, obstacles such as pipe bends, or tees can be introduced upstream of 140 for separation or geometry purposes and placed such that the particles are most likely to bias into the first exit conduit 142.

The inner diameter of the inlet conduit 141, the first exit conduit 142, and the second exit conduit 143 can be the same or different with respect to one another. The inner diameter of the inlet conduit 141, the first exit conduit 142, and second exit conduit 143 can be sized according to the particular system 100 and can widely vary depending on the particular process.

It has been surprisingly and unexpectedly discovered that a length of the first exit conduit 142 plus a length of the flow control device 150, together shown as ($d_1$), in FIG. 1, significantly affects the efficiency of the separator. More particularly, it has been discovered that when the length $d_1$ is ≤about 3 to 8 times or 3 to 5 times an inner diameter of the first exit conduit 142 the coke the particle separation efficiency of the separator 140 can significantly increase. This is the approximate minimum which can be constructed if using standardized piping components. The length of d1 can be minimized to the smallest value within physical constraints. When d1 is not minimized, computational analysis suggests that the particles can be easily re-entrained into the furnace effluent and are not fully separated. As such, in some examples, the length $d_1$ can be ≤8, ≤7, ≤6, ≤4, or ≤3 times the inner diameter of the first exit conduit 142. In some examples, the length $d_1$ can be ≥2, ≥3, ≥4, or ≥5× the inner diameter of the first exit conduit 142 and ≤8, ≤7, ≤6, ≤4 or ≤3×the inner diameter of the first exit conduit 142.

During decoking mode, the decoking effluent via line 136 can be introduced into the separator 140 and as the coke particles flow through the first exit conduit 142 steam via one or more steam injection lines 155 can be introduced within the coke catch apparatus 160 adjacent the location the flow control device 150 connects or couples thereto. The flow of steam through 155 into 160 can be very low relative to the total flow through 140. Sufficient steam is only provided as necessary to maintain a steam like atmosphere in 142 and 160. The effect of the steam rate can be analyzed to not affect the particle stream and generally can be a very small portion of the total mass flow rate.

A coke-lean hydrocarbon can be removed via line 149 from the second exit conduit 143. In some examples, the coke-lean effluent in line 149 can contain ≤45 wt. %, ≤40 wt. %, ≤35 wt. %, ≤30 wt. %, ≤25 wt. %, ≤20 wt. %, ≤15 wt. %, or ≤10 wt. % of the coke particles contained in the combined effluent in line 136.

Figure 2:
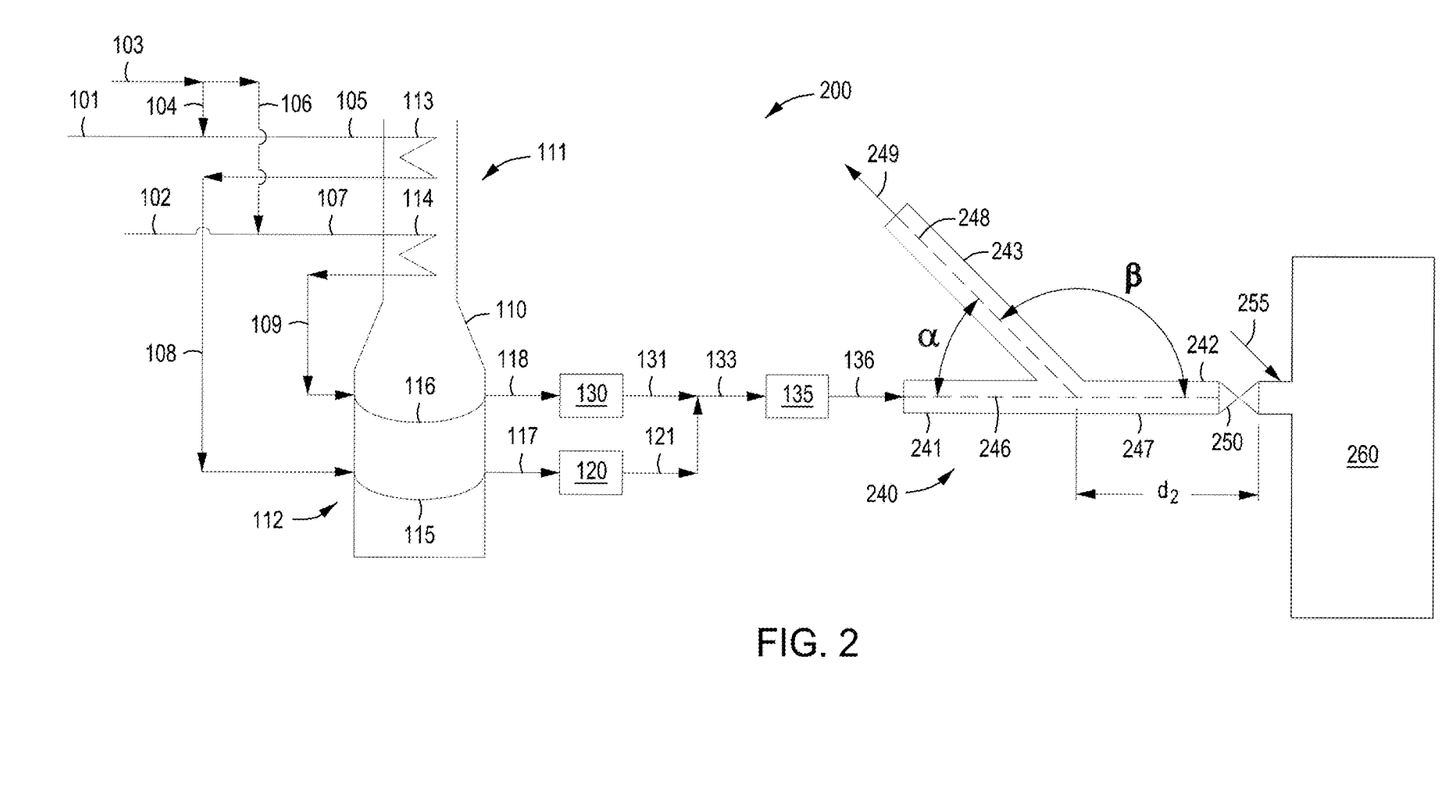
FIG. 2 depicts a schematic of another illustrative system for steam cracking a hydrocarbon and recovering spalled coke therefrom during online decoking, according to one or more embodiments described.

FIG. 2 depicts a schematic of another illustrative system 200 for steam cracking the hydrocarbon feeds in lines 101 and 102 and recovering spalled coke via a first exit conduit 242 of a separator 240 during online decoking, according to one or more embodiments. The system 200 can be similar to the system 100 discussed above with reference to FIG. 1 where like reference numbers can refer to substantially the same component. The system 200 can include the separator 240, one or more flow control devices 250, e.g., a valve, and one or more coke receiving or coke catch apparatus 260. The coke receiving apparatus 160 can include a number of different containment devices, e.g., collection vessels, collection drums, piping, tanks and/or rail cars.

In some examples, a longitudinal axis 247 of the first exit conduit 242 can be substantially aligned with a longitudinal axis 246 of the inlet conduit 241 and a longitudinal axis 248 of the second exit conduit 243 can be angled with respect to the longitudinal axis 246 of the inlet conduit 241 and the longitudinal axis 247 of the first exit conduit 242. In some examples, the longitudinal axis 248 of the second exit conduit 243 can be at an angle (α) of about 20° to about 90°, e.g., about 45°, relative to the longitudinal axis 246 of the inlet conduit 241 and the longitudinal axis 248 of the second exit conduit 243 can be at an angle (β) of about 90° to about 160°, e.g., about 135°, relative to the longitudinal axis 247 of the first exit conduit 242. In other examples, the longitudinal axis 248 of the second exit conduit 243 can be at an angle of about 45° to about 90° relative to the longitudinal axis 246 of the inlet conduit 241 and the longitudinal axis 248 of the second exit conduit 243 can be at an angle (β) of about 90° to about 135° relative to the longitudinal axis 247 of the first exit conduit 242. In some examples, the separator 240 can be an "off the shelf" pipe joint such as a 90° pipe tee fitting or a 45° lateral tee pipe fitting. In other examples, the separator 240 can be custom manufactured to have any desired arrangement of the inlet conduit 241, the first exit conduit 242, and the second exit conduit 243.

As shown in FIG. 2, the separator 240 can be oriented such that the longitudinal axis 246 of the inlet conduit 241 and the longitudinal axis 247 of the first outlet conduit 242 can be substantially horizontal, i.e., with respect to a surface of the earth. In some examples, however, the separator 240 can be oriented such that the longitudinal axis 246 of the inlet conduit 241 and the longitudinal axis 247 of the first outlet conduit 242 can be substantially vertical, i.e., with respect to a surface of the earth. In other examples, the separator 240 can be oriented such that the longitudinal axis 246 of the inlet conduit 241 and the longitudinal axis 247 of the first outlet conduit 242 can be at any angle between vertical and horizontal, i.e., with respect to a surface of the earth.

A coke-lean hydrocarbon can be removed via line 249 from the second exit conduit 243. In some examples, the coke-lean effluent in line 249 can contain ≤45 wt. %, ≤40 wt. %, ≤35 wt. %, ≤30 wt. %, ≤25 wt. %, ≤20 wt. %, ≤15 wt. %, or ≤10 wt. % of the coke particles contained in the combined effluent in line 136.

Figure 3:
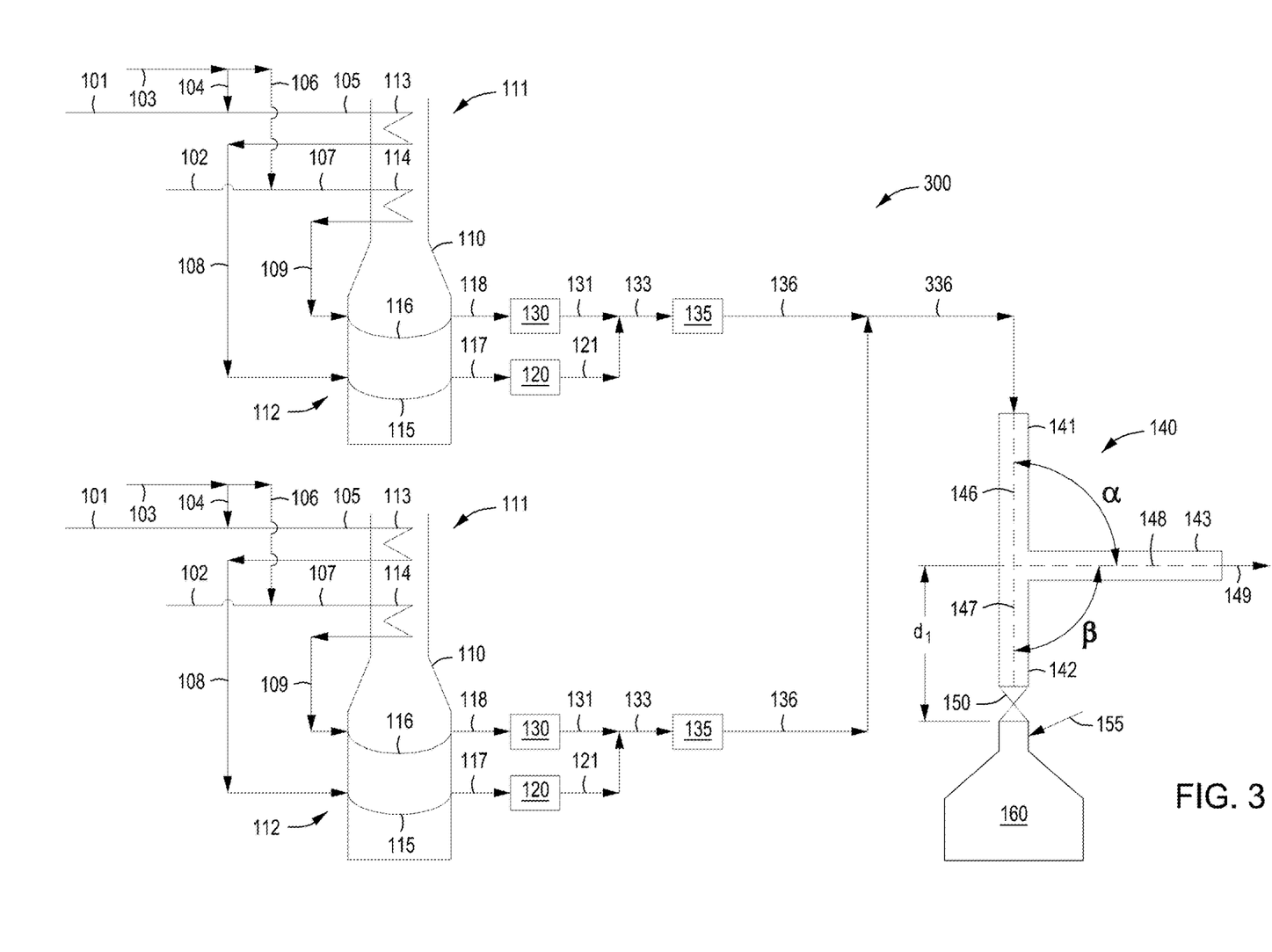
FIG. 3 depicts a schematic of another illustrative system for steam cracking a hydrocarbon and recovering spalled coke therefrom during online decoking, according to one or more embodiments described.

FIG. 3 depicts a schematic of another illustrative system 300 for steam cracking a hydrocarbon feed in lines 101 and 102 and recovering spalled coke via a first exit conduit 142 of a separator 140 during online decoking, according to one or more embodiments. As shown in FIG. 3, multiple steam crackers 111 can be configured to combine the steam cracker effluents and decoking effluents via lines 136 to produce a combined effluent via line 336. The combined effluent produced from multiple steam crackers 111 can be introduced into the separator 140. In another examples, the combined effluent produced from multiple steam crackers 111 can be introduced into the separator 240 shown in FIG. 2.

Referring to FIGS. 1 to 3, the separators 140,240 can be located with a steam cracking system in any number of locations. As shown, the separators 140 and 240 can be located downstream of the secondary heat exchange stage 135. In some examples, the separator 140 and 240 can be located between the primary heat exchange stages 120 and 130 and the secondary heat exchange stage 135 such that the combined effluent in line 133 flows into the separator 140 or 240. In other examples, the separators 140, 240 can be located downstream of the primary separators 120, 130 such that the pre-cooled steam cracker effluents via lines 121 and 131 each flow into a separator 140 or 240.

It should be understood that the systems 100, 200 can include any number of separators 140, 240. In some examples, the systems 100, 200 can include 1, 2, 3, 4, 5, 6, 7, 8, 9, 10, or more separators 140 and/or 240. In some examples, if the system 100, 200 includes a plurality of separators 140 and/or 240 the separators can be located at different locations with the system 100, 200. In other examples, if the system 100, 200 includes a plurality of separators 140 and/or 240 the separators can be located at the same location, i.e., between the same two pieces of equipment such as the secondary heat exchange state 135 and the coke catch apparatus 160 or 260. When located at the same location within the system 100, 200 the plurality of separators 140 and/or 240 can be arranged in any configuration with respect to one another.

For example, the plurality of separators 140 and/or 240 can be in series, parallel, or a combination of series and parallel with respect to one another.

Hydrocarbon Feed

In some examples, the hydrocarbon feed in line 101 and 102 independently can be or include, but is not limited to, relatively high molecular weight hydrocarbons ("heavy feedstocks"), such as those that produce a relatively large amount of steam cracker tar ("SCT") during steam cracking. Examples of heavy feedstocks can include one or more of steam cracked gas oil and residues, gas oils, heating oil, jet fuel, diesel, kerosene, coker naphtha, steam cracked naphtha, catalytically cracked naphtha, hydrocrackate, reformate, raffinate reformate, Fischer-Tropsch liquids, Fischer-Tropsch gases, distillate, crude oil, atmospheric pipestill bottoms, vacuum pipestill streams including bottoms, gas oil condensates, heavy non-virgin hydrocarbon streams from refineries, vacuum gas oils, heavy gas oil, naphtha contaminated with crude, atmospheric residue, heavy residue, $C_4$/residue admixture, naphtha/residue admixture, gas oil/residue admixture, and crude oil. In some examples, the hydrocarbon feed can have a nominal final boiling point $\geq 315°$ C., $\geq 399°$ C., $\geq 454°$ C., or $\geq 510°$ C. Nominal final boiling point means the temperature at which 99.5 wt. % of a particular sample has reached its boiling point.

Optionally, e.g., when the hydrocarbon feed comprises certain heavy feedstocks, the system 100 can include one or more vapor/liquid separators (sometimes referred to as flash pot or flash drum) integrated therewith. When used, the vapor-liquid separator can be configured to upgrade the hydrocarbon feed, e.g., by upgrading the hydrocarbon and steam mixture, upstream of the steam cracking furnace's radiant section 112. In some examples, it can be desirable to integrate a vapor-liquid separator with the furnace when the hydrocarbon feed includes $\geq 1$ wt. % of non-volatiles, e.g., $\geq 5$ wt. %, such as about 5 wt. % to about 50 wt. % of non-volatiles having a nominal boiling point of $\geq 760°$ C. In some examples, it can be desirable to integrate a vapor/liquid separator with the pyrolysis furnace when the non-volatiles include asphaltenes, such as $\geq$ about 0.1 wt. % asphaltenes based on the weight of the hydrocarbon feed, e.g., $\geq$ about 5 wt. %. Conventional vapor/liquid separation devices can be utilized to do this, though the invention is not limited thereto. Examples of such conventional vapor/liquid separation devices can include those disclosed in U.S. Pat. Nos. 7,138,047; 7,090,765; 7,097,758; 7,820,035; 7,311, 746; 7,220,887; 7,244,871; 7,247,765; 7,351,872; 7,297, 833; 7,488,459; 7,312,371; 6,632,351; 7,578,929; and 7,235,705. A vapor phase can be separated from the hydrocarbon feed in the vapor/liquid separation device. The separated vapor phase can be conducted away from the vapor/liquid separator to the radiant coils 115, 117 for steam cracking. The liquid-phase separated from the hydrocarbon feed can be conducted away from the vapor/liquid separation device, e.g., for storage and/or further processing.

In other examples, the hydrocarbon feed can include one or more relatively low molecular weight hydrocarbon (light feedstocks), particularly those aspects where relatively high yields of $C_2$ unsaturates (ethylene and acetylene). Light feedstocks can include substantially saturated hydrocarbon molecules having fewer than five carbon atoms, e.g., ethane, propane, and mixtures thereof (e.g., ethane-propane mixtures or "E/P" mix). For ethane cracking, a concentration of at least 75 wt. % of ethane is typical. For E/P mix, a concentration of at least 75 wt. % of ethane plus propane is typical, the amount of ethane in the E/P mix can be $\geq 20$ wt. % based on the weight of the E/P mix, e.g., of about 25 wt. % to about 75 wt. %. The amount of propane in the E/P mix can be, e.g., $\geq 20$ wt. %, based on the weight of the E/P mix, such as of about 25 wt. % to about 75 wt. %.

Examples

The foregoing discussion can be further described with reference to the following non-limiting prophetic examples. Computational fluid dynamics (CFD) modeling is done to determine particle separation efficiency for a separator having an inlet conduit, a first exit conduit coupled to the inlet conduit, and a second exit conduit coupled to the inlet conduit, according to one or more embodiments disclosed herein. The longitudinal axis of the first exit conduit is substantially aligned with the longitudinal axis of the inlet conduit and the longitudinal axis of the second exit conduit is angled at 90° with respect to the longitudinal axis of the inlet conduit and the longitudinal axis of the first exit conduit.

Two computational fluid dynamics modeling simulations are carried out for two separators. The CFD Model 1 is a 2D simulation of a furnace effluent line. The model is sized to be equal to a commercially operated unit with known process variables. The effluent properties are determined by simulation of the convection and radiant sections of the commercial operation, and the resultant average velocity in the line is 54.86 m/s (180 ft/s). Particles are introduced as Lagrangian particles based on a volumetric distribution of previously sampled coke particles from a similar furnace. Sample particles ranged up to 4 mm in diameter and were simulated to be perfectly spherical particles. When introduced to the model, the particles are assumed to be moving at the effluent velocity at the introduced location. For each particle size, the number of particles is counted to determine an approximate weight separation efficiency. Results from CFD Model 1 and CFD Model 2 were used as a regression to create a broader mathematical model to assist in optimizing the geometry of the separator, shown in the right column of Table 1 and Table 2.

TABLE 1

CFD Model 1 Data

| Stokes Number | CFD Model 1 Wt. % of particles out first exit conduit | Mathematical Model Prediction based on CFD Data Wt. % of particles out first exit conduit |
|---|---|---|
| 15420 | 95 | 95 |
| 3855 | 95 | 95 |
| 963 | 90 | 87 |
| 475 | 85 | 82 |
| 167 | 80 | 75 |
| 10 | 60 | 56 |
| 9 | 60 | 0 |
| 0.85 | 45 | 0 |
| 0.08 | 20 | 0 |

The CFD Model 2 is performed to further improve the mathematical model predictions and analyze the efficiency of a separate system. CFD Model 2 is a 3D model of a similar sized line with process variables from a different commercial unit. Assumptions of the model are the same as CFD Model 1, except for the addition of 3-dimensional effects. Mean velocity in this system is approximately 76.2 m/s (250 ft/s).

TABLE 2

CFD Model 2 Data

| Stokes Number | CFD Model 2 Wt. % of particles out first exit conduit | Mathematical Model Prediction based on CFD Data Wt. % of particles out first exit conduit |
|---|---|---|
| 853 | 98% | 86% |
| 691 | 100% | 85% |
| 546 | 100% | 83% |
| 418 | 100% | 81% |
| 307 | 100% | 79% |
| 213 | 97% | 77% |
| 137 | 94% | 74% |
| 77 | 88% | 70% |
| 34 | 66% | 64% |
| 9 | 30% | 0% |
| 0 | 0% | 0% |

As shown in Tables 1 and 2, when the Stokes number is ≥10 a significant increase in separation efficiency is observed. As the Stokes number increases, the efficiency of the system also increases, as expected. Based on the CFD results, it can be seen that increasing the Stokes number can lead to greater efficiency, and that a Stokes ≥10 begins to provide sufficient separation of coke in the furnace effluent lines. The mathematical model created from CFD Model 1 and CFD Model 2 can be used to estimate a given geometry before performing amore detailed analysis such as a CFD. As is clear from CFD Model 1 and CFD Model 2, exact estimation of particle efficiency may require specific CFD modelling. In cases where rough estimation is sufficient, the Mathematical Model can provide screening value to a particular system.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A hydrocarbon pyrolysis process, comprising:
introducing a hydrocarbon feed into a pyrolysis furnace comprising a first radiant coil and a second radiant coil;
pyrolysing at least a portion of a first quantity of the hydrocarbon feed in the first radiant coil to produce a first hydrocarbon effluent and to deposit coke on an inner surface of the first radiant coil;
pyrolysing at least a portion of a second quantity of the hydrocarbon feed in the second radiant coil to produce a second hydrocarbon effluent and to deposit coke on an inner surface of the second radiant coil;
decreasing a flow rate of the hydrocarbon feed into the first radiant coil while maintaining a flow rate of the hydrocarbon feed into the second radiant coil;
introducing a decoking feed comprising steam or a mixture of steam and air into the first radiant coil of the pyrolysis furnace to remove at least a portion of the coke deposited on the inner surface of the first radiant coil and to produce a de-coking effluent comprising steam and a plurality of coke particles;
indirectly exchanging heat from the second hydrocarbon effluent to water, steam, or a mixture thereof to produce a cooled second hydrocarbon effluent;
indirectly exchanging heat from the de-coking effluent to water, steam, or a mixture thereof to produce a cooled de-coking effluent;
mixing the cooled second hydrocarbon effluent and the cooled de-coking effluent to produce a combined effluent;
introducing the combined effluent into an inlet conduit of a separator under conditions that provide ≥80 wt. % of the plurality of coke particles with a Stokes number of ≥10;
removing ≥55 wt. % of the plurality of coke particles in the combined effluent from a first exit conduit of the separator, and
removing a coke-lean hydrocarbon effluent comprising ≤45 wt. % of the plurality of coke particles in the combined effluent from a second exit conduit of the separator, wherein the first exit conduit is coupled to the inlet conduit, and wherein the second exit conduit is coupled to the inlet conduit, wherein:
the plurality of coke particles is introduced into a coke catch apparatus,
a flow control device couples the first exit conduit to the coke catch apparatus, and
a total length of the first exit conduit and the flow control device is ≤8 times an inner diameter of the first exit conduit.

2. The process of claim 1, further comprising introducing steam is introduced into the coke catch apparatus adjacent the location the flow control device couples the first exit conduit to the coke catch apparatus.

3. The process of claim 1, wherein the combined effluent is introduced into the inlet conduit of the separator under conditions that provide ≥80 wt. % of the plurality of coke particles with a Stokes number of ≥10 to about 15,000, and wherein ≥70 wt. % of the plurality of coke particles in the combined effluent is recovered from the first exit conduit.

4. The process of claim 1, wherein a longitudinal axis of the first exit conduit is substantially aligned with a longitudinal axis of the inlet conduit, and wherein the second exit conduit is angled with respect to the inlet conduit and the first exit conduit to provide an angle of about 20° to about 90° between a longitudinal axis of the second exit conduit and the longitudinal axis of the inlet conduit and an angle of about 90° to about 160° between the longitudinal axis of the second exit conduit and the longitudinal axis of the first exit conduit.

5. The process of claim 1, wherein a longitudinal axis of the first exit conduit is substantially aligned with a longitudinal axis of the inlet conduit, and wherein the second exit conduit is angled with respect to the inlet conduit and the first exit conduit to provide an angle of about 45° to about 90° between a longitudinal axis of the second exit conduit and the longitudinal axis of the inlet conduit and an angle of about 90° to about 135° between the longitudinal axis of the second exit conduit and the longitudinal axis of the first exit conduit.

6. The process of claim 1, wherein the hydrocarbon feed comprises ethane, propane, naphtha, gas oil, vacuum gas oil, waxy residues, atmospheric residues, residue admixtures, crude oil, or a mixture thereof.

7. The process of claim 1, wherein the decoking feed comprises a mixture of steam and air.

8. The process of claim 1, wherein a flow path from the inlet conduit into the first exit conduit is free of any obstruction, and wherein a flow path from the inlet conduit into the second exit conduit is free of any obstruction.

9. The process of claim 1, wherein a longitudinal axis of the first exit conduit is oriented at an angle of about 0° to about 90° with respect to a surface of the earth.

10. The process of claim 1, further comprising indirectly exchanging heat from the combined effluent to water, steam, or a mixture of water and steam to produce a cooled combined effluent, wherein the cooled combined effluent is introduced into the inlet conduit.

11. A hydrocarbon pyrolysis process, comprising:
introducing a hydrocarbon feed into a pyrolysis furnace comprising a first radiant coil and a second radiant coil, wherein the hydrocarbon feed comprises ethane, propane, naphtha, gas oil, vacuum gas oil, waxy residues, atmospheric residues, residue admixtures, crude oil, or a mixture thereof;
pyrolysing at least a portion of a first quantity of the hydrocarbon feed in the first radiant coil to produce a first hydrocarbon effluent and to deposit coke on an inner surface of the first radiant coil;
pyrolysing at least a portion of a second quantity of the hydrocarbon feed in the second radiant coil to produce a second hydrocarbon effluent and to deposit coke on an inner surface of the second radiant coil;
decreasing a flow rate of the hydrocarbon feed into the first radiant coil while maintaining a flow rate of the hydrocarbon feed into the second radiant coil;
introducing a decoking feed comprising steam or a mixture of steam and air into the first radiant coil of the pyrolysis furnace to remove at least a portion of the coke deposited on the inner surface of the first radiant coil and to produce a de-coking effluent comprising steam and a plurality of coke particles;
indirectly exchanging heat from the second hydrocarbon effluent to water, steam, or a mixture thereof to produce a cooled second hydrocarbon effluent;
indirectly exchanging heat from the de-coking effluent to water, steam, or a mixture thereof to produce a cooled de-coking effluent;
mixing the cooled second hydrocarbon effluent and the cooled de-coking effluent to produce a combined effluent;
introducing the combined effluent into an inlet conduit of a separator under conditions that provide ≥80 wt. % of the plurality of coke particles with a Stokes number of ≥10 to about 20,000;
removing ≥70 wt. % of the plurality of coke particles in the combined effluent from a first exit conduit of the separator, and
removing a coke-lean hydrocarbon effluent comprising ≤30 wt. % of the plurality of coke particles in the combined effluent from a second exit conduit of the separator, wherein:
the first exit conduit is coupled to the inlet conduit,
the second exit conduit is coupled to the inlet conduit,
a longitudinal axis of the first exit conduit is substantially aligned with a longitudinal axis of the inlet conduit,
the second exit conduit is angled with respect to the inlet conduit and the first exit conduit to provide an angle of about 45° to about 90° between a longitudinal axis of the second exit conduit and the longitudinal axis of the inlet conduit and an angle of about 90° to about 135° between the longitudinal axis of the second exit conduit and the longitudinal axis of the first exit conduit,
the plurality of coke particles is introduced into a coke catch apparatus,
a flow control device couples the first exit conduit to the coke catch apparatus, and
a total length of the first exit conduit and the flow control device is <8 times an inner diameter of the first exit conduit.

12. The process of claim 11, further comprising introducing steam into the coke catch apparatus adjacent the location the flow control device couples the first exit conduit to the particle receiving apparatus.

13. A process for separating particles from a fluid, comprising:
introducing a mixture comprising a gaseous hydrocarbon and a plurality of particles into an inlet conduit under conditions that provide ≥80 wt. % of the plurality of particles with a Stokes number of ≥10,
recovering ≥55 wt. % of the plurality of particles in the mixture from a first exit conduit coupled to the inlet conduit, wherein:
the plurality of particles recovered from the first exit conduit is introduced into a particle receiving apparatus,
a flow control device couples the first exit conduit to the particle receiving apparatus, and
a total length of the first exit conduit and the flow control device is ≤8 times an inner diameter of the first exit conduit; and recovering a particle-lean gaseous hydrocarbon comprising ≤45 wt. % of the plurality of particles present in the mixture from a second exit conduit coupled to the inlet conduit.

14. The process of claim 13, wherein a longitudinal axis of the first exit conduit is substantially aligned with a longitudinal axis of the inlet conduit, and wherein the second exit conduit is angled with respect to the inlet conduit and the first exit conduit to provide an angle of about 20° to about 90° between a longitudinal axis of the second exit conduit and the longitudinal axis of the inlet conduit and an angle of about 90° to about 160° between the longitudinal axis of the second exit conduit and the longitudinal axis of the first exit conduit.

15. The process of claim 13, wherein a longitudinal axis of the first exit conduit is substantially aligned with a longitudinal axis of the inlet conduit, and wherein the second exit conduit is angled with respect to the inlet conduit and the first exit conduit to provide an angle of about 45° to about 90° between a longitudinal axis of the second exit conduit and the longitudinal axis of the inlet conduit and an angle of about 90° to about 135° between the longitudinal axis of the second exit conduit and the longitudinal axis of the first exit conduit.

16. The process of claim 13, wherein >60 wt. % of the plurality of particles in the mixture is recovered from the first exit conduit.

17. The process of claim 13, wherein a flow path from the inlet conduit into the first exit conduit is free of any obstruction, and wherein a flow path from the inlet conduit into the second exit conduit is free of any obstruction.

18. The process of claim 13, wherein the plurality of particles have a Stokes number of about 100 to about 10,000.

19. The process of claim 13, wherein the plurality of particles have a Stokes number of about 1,000 to about 20,000.

20. The process of claim 13, wherein the mixture further comprises steam, wherein the gaseous hydrocarbon comprises ethylene, and wherein the plurality of particles comprises coke removed from an inner surface of a radiant coil disposed within a steam cracking furnace.

21. The process of claim 13, further comprising introducing steam into the particle receiving apparatus adjacent the location the flow control device couples the first exit conduit to the particle receiving apparatus.

22. A separator for separating particles from a fluid, comprising:
an inlet conduit configured to receive an effluent comprising hydrocarbons, steam, and a plurality of coke particles, wherein the inlet conduit is further configured to provide ≥80 wt. % of the plurality of coke particles with a Stokes number of ≥10;
a first exit conduit coupled to the inlet conduit;
a second exit conduit coupled to the inlet conduit;
a particle receiving apparatus in fluid communication with the first exit conduit, the particle receiving apparatus configured to receive coke particles; and
a flow control device that couples the first exit conduit to the particle receiving apparatus, wherein:
a longitudinal axis of the first exit conduit is substantially aligned with a longitudinal axis of the inlet conduit,
the second exit conduit is angled with respect to the inlet conduit and the first exit conduit to provide an angle of about 20° to about 90° between a longitudinal axis of the second exit conduit and the longitudinal axis of the inlet conduit and an angle of about 90° to about 160° between the longitudinal axis of the second exit conduit and the longitudinal axis of the first exit conduit, and
a total length of the first exit conduit and the flow control device is <8 times an inner diameter of the first exit conduit.

23. The separator of claim 22, wherein the longitudinal axis of the inlet conduit and the longitudinal axis of the first exit conduit are substantially parallel to a surface of the earth, substantially perpendicular to a surface of the earth, or oriented at an angle anywhere between 0° and 90° with respect to a surface of the earth.

24. The separator of claim 22, wherein a flow path from the inlet conduit into the first exit conduit is free of any obstruction, and wherein a flow path from the inlet conduit into the second exit conduit is free of any obstruction.

25. The separator of claim 22, further comprising a steam injection line configured to introduce steam into the particle receiving apparatus, wherein the steam injection line is in fluid communication with the particle receiving apparatus adjacent the location the flow control device couples the first exit conduit to the particle receiving apparatus.

* * * * *